(12) United States Patent
Lai

(10) Patent No.: US 7,377,518 B2
(45) Date of Patent: May 27, 2008

(54) MECHANICAL SEAL RING ASSEMBLY WITH HYDRODYNAMIC PUMPING MECHANISM

(75) Inventor: Wei-Tang Lai, Hoffman Estates, IL (US)

(73) Assignee: John Crane Inc., Morton Grove, IL (US)

(*) Notice: Subject to any disclaimer, the term of this patent is extended or adjusted under 35 U.S.C. 154(b) by 29 days.

(21) Appl. No.: 11/100,728

(22) Filed: Apr. 7, 2005

(65) Prior Publication Data
US 2005/0263963 A1   Dec. 1, 2005

Related U.S. Application Data

(63) Continuation-in-part of application No. 10/856,718, filed on May 28, 2004, now abandoned.

(51) Int. Cl.
*F16J 15/34* (2006.01)
(52) U.S. Cl. .................. 277/400; 277/403
(58) Field of Classification Search ........ 277/399–400, 277/403
See application file for complete search history.

(56) References Cited

U.S. PATENT DOCUMENTS

| | | | |
|---|---|---|---|
| 3,744,805 A | 7/1973 | Heinrich | |
| 4,407,512 A | 10/1983 | Trytek | |
| 4,799,693 A * | 1/1989 | Johnston | 277/400 |
| 4,836,561 A | 6/1989 | Lebeck et al. | |
| 5,090,712 A | 2/1992 | Pecht et al. | |
| 5,092,612 A | 3/1992 | Victor et al. | |
| 5,556,111 A | 9/1996 | Sedy | |
| 5,938,206 A | 8/1999 | Klosterman et al. | |
| 5,947,481 A | 9/1999 | Young | |
| 6,109,379 A | 8/2000 | Madwed | |
| 6,446,976 B1 | 9/2002 | Key et al. | |
| 6,454,268 B1 | 9/2002 | Muraki | |
| 6,626,436 B2 | 9/2003 | Pecht et al. | |

FOREIGN PATENT DOCUMENTS

EP    0935086 A2    8/1999

* cited by examiner

*Primary Examiner*—Vishal Patel
(74) *Attorney, Agent, or Firm*—Leydig, Voit & Mayer, Ltd.

(57) ABSTRACT

A seal ring configuration adapted to be disposed about a shaft to seal a fluid at a pressure differentials across the seal. The seal ring configuration comprises a mating ring and an axially movable primary ring. The primary ring includes a seal face in opposing relationship to the mating ring seal face to define a seal interface. The mating ring seal face or the primary ring seal face defines an annular axially recessed section and a dam section. The recessed section is axially disposed further from the cooperating seal face relative to the dam section. The axially recessed section further includes a face pattern axially spaced further from the dam section than the recessed portion and is capable of generating a hydrodynamic force between the mating ring seal face and the primary ring seal face.

13 Claims, 6 Drawing Sheets

MECHANICAL SEAL RING ASSEMBLY WITH HYDRODYNAMIC PUMPING MECHANISM

This application is a continuation-in-part of application Ser. No. 10/856,718, filed on May 28, 2004 now abandoned and a claim to priority under Title 35 U.S.C. § 120 is made to that application.

BACKGROUND OF THE INVENTION

This invention relates to rotary mechanical end face seals and more specifically to seals which include some form of pumping mechanism on one of the seal faces.

End face seals depend upon the constant flatness and parallelity of their cooperating radially disposed faces for the effectiveness of the seal produced by these faces. Initially, the faces are lapped flat and smooth so that when placed together, there is no space through which the fluid to be sealed can escape. In use, however, these faces are subjected to uneven wear because of (1) differing linear speeds of the faces produced by the differing radii of the faces; (2) lack of homogeneity of the material of the faces; (3) distortion of the faces by the pressure of the fluid on the rings on which the faces are formed; and (4) poor lubrication.

The first factor cannot be eliminated since it is inherent in the operation of two flat surfaces rubbing together with a rotating movement.

The second factor can be controlled to some extent, but since the material of the rings is determined by the nature of the fluid to be sealed, the choice of material is limited. In high pressure, large diameter water applications, one of the sealing rings is made of carbon. This material is difficult to mold in such manner that it is perfectly homogeneous in the large diameters and masses required to withstand the pressures encountered.

The third factor has lead to various balancing arrangements and to increases in the amount of material in the ring, the latter to provide greater stiffness to resist the pressure of the fluid. However, balancing is effective in an axial direction and has little or no effect upon radial pressure differences which are largely responsible for pressure distortion in the ring. Increasing the mass of the ring aggravates the difficulty in assuring homogeneity in the material of the ring.

The fourth factor is more difficult to detect than to remedy.

Over the years, seal designers have evolved certain design principles which serve to assist them in solving seal design problems. These are (a) increased seal balancing to reduce axial pressure on the seal faces and, hence, wear of said faces, (b) increased face width to reduce unit pressure on the faces, (c) zero turning moment of the ring and seat about the centroid of their axial sections at operating pressures to assure parallelity of the seal faces and, hence, even wear thereacross, and (d) the use of relieved areas (hydro-pads) on at least one seal face to draw lubricant between the faces when they move relative to one another. Commonly assigned, U.S. Pat. No. 4,407,512 to Trytek discloses such hyrdo-pads formed on primary ring seal face to draw lubricant between the faces of the mating ring and the primary ring to reduce friction between the faces.

The present invention is an improvement over the seal arrangement disclosed in U.S. Pat. No. 4,407,512, as well as, other non-contacting seal arrangements. It is expected to constitute an improvement and complement virtually every patterned face seal arrangement where modulation of the pumping effectiveness of the pattern is desired.

Use of a pattern on one face of a mechanical end face seal to create a pumping mechanism to arrangement movement of fluid between the faces is common. Such face patterns create hydrodynamic lift to create a fluid film between the faces. Seal arrangements are employed in pumps, compressors, mixers and other devices to retain a fluid such as a gas or liquid. Often the pumping mechanism is arranged to pump a buffer gas between the faces against the flow of the process fluid. U.S. Pat. Nos. 4,212,475; 4,407,512; 4,836,561; 5,092,617; 5,556,111; 5,938,206; 5,947,481; 6,446,976; 6,454,268; and 6,626,436 are but a few numerous seal arrangements that illustrate a variety of mechanical end face seal applications where a pumping mechanism is employed.

It has been found that for certain applications it is desirable to moderate the pumping effectiveness of the pumping mechanism. For example, in certain applications, it has been found that though a pumping mechanism on the face is important to seal operation and durability, its use can result in undesirable or excessive leakage.

The present invention provides a structure that tempers the effectiveness of the pumping mechanism and also provides a generally annular path about the seal face that permits uniform distribution of the fluid pumped by the pumping mechanism. In accordance with the present invention, a recessed surface is provided throughout the area which forms the pumping mechanism. That is, to say, in the known seal arrangements with a pumping mechanism such a hydro-pad seal, a wavy face seal or a spiral groove seal, the face includes a dam area and a face pattern area. The dam area is a axially outermost annular surface, which is in facing relation to the opposing seal ring. The face pattern area, which may be radially outward or radially inward from the dam area includes a pattern formed axially into the seal ring by some measurable amount from the plane of the face of the dam area. Depending on the pattern employed, the pattern area in prior known seal arrangements also includes areas which are coplanar with the plane of the dam area. Such is the case with a seal face with a spiral groove pumping mechanism or a hydro-pad arrangement.

The present invention embodies removal of some of the surface within the pattern area that would otherwise reside in the same plane with the dam area. The entire face pattern area is provided with a recessed surface that is displaced axially recessed relative to the plane of the annular dam surface in a direction away from the seal interface with the opposing ring seal face. This configuration provides a permanent gap between the pattern area and the opposing face formed on the other seal ring. The pattern then defines recessed areas that are recessed relative to the plane of the annular recessed area.

By providing the recessed area over the face pattern, the pumping effectiveness of the pumping mechanism is diminished somewhat. That result derives from the fact that the relatively rotating faces are spaced further apart than would be the case in a seal arrangement that did not embody the present invention. The space between the recessed surface and the face of the cooperating ring also provide a generally annular path for fluid distribution about the entire annular seal ring interface. This relationship improves lubrication and seal ring cooling and reduces seal face thermal distortion.

The present invention is considered suitable for use in virtually all patterned face seals including, without limitation, seals disclosed in the patents identified herein. It can be applied to a seal face with hydro-pads formed in the pumping mechanism area, or spiral grooves, "T" grooves, or other groove patterns or a wavy-tilt face pattern seal. It can be employed in a seal application that is I.D. (inside diameter) pressurized or O.D. (outside diameter) pressurized. It can be employed in seals that permit process fluid to flow across the seal ring interface or seal applications that pump a buffer fluid between the faces. The buffer could be a gas to seal against a gas or liquid process fluid or a liquid buffer to seal against a liquid process fluid. The advantages of the invention can be adapted to each of these known prior seal arrangements

DETAILED DESCRIPTION OF THE DRAWINGS

Figure 1:
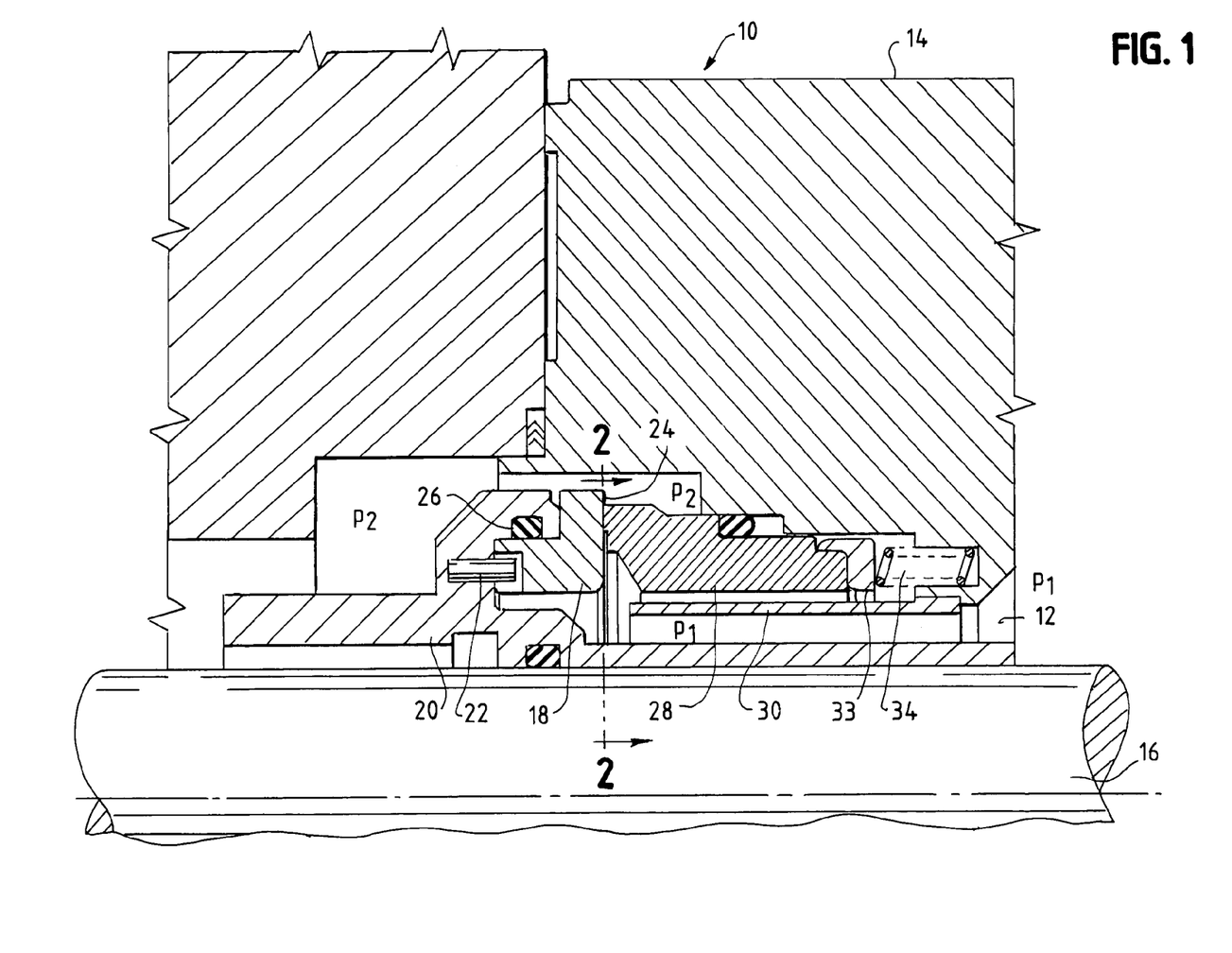
FIG. 1 is a sectional side view of a seal arrangement in accordance with the present invention.

Referring now to FIG. 1, an inventive seal arrangement 10 is illustrated in a single seal arrangement with the pressure at the inner diameter side of the seal face greater than the pressure at the outer diameter side of the seal face. The seal arrangement is intended to seal a fluid, either a gas or liquid, at a high pressure differentials across the seal.

As in most mechanical seals, the seal arrangement 10 is intended to seal a fluid within a chamber 12 defined by a housing 14. A shaft 16 extends through the housing 14. Because the shaft 16 is intended to rotate relative to the housing 14, a seal must be provided to prevent or inhibit leakage of the fluid in the chamber 12.

The seal arrangement 10 includes a seal ring configuration comprising a mating ring 18 rotationally fixed relative to a sleeve 20 by a pin 22. The sleeve 20 is mounted on the shaft 16 and rotates with the shaft. The mating ring 18 includes a mating ring seal face 24. An O-ring 26 seals the mating ring 18 to the sleeve 20 so that no leakage occurs through these connections. The seal ring assembly also includes an axially movable primary ring 28 retained within a gland adaptor assembly 30. The primary ring 28 includes a primary ring seal face 32 (see FIG. 2).

The seal assembly 10 of the present invention operates as follows. The seal system defines a high pressure zone $P_1$, also known as process zone, in the chamber 12 upstream of the seal faces 24,32. A low pressure zone $P_2$ exists downstream of the seal faces 24,32. For an inner diameter pressurized seal assembly, as with the type illustrated in FIG. 1, the high pressure zone $P_1$ is at the inner diameter side of the seal faces 24,32 and the low pressure zone $P_2$ is at the outer diameter side of the seal faces 24,32.

The seal assembly 10 functions to prevent the escape of fluid located in the high pressure zone $P_1$ to the low pressure zone $P_2$. To accomplish such function, the primary ring seal face 32 engages the mating ring seal face 24 along a sealing interface, which limits the escape of fluid from the high pressure zone $P_1$ to the low pressure zone $P_2$. The primary ring 28 is axially biased by a biasing means, such as a spring 34. A disk 33 is situated axially between the spring 34 and the primary ring 28. The spring 34 biases the primary ring 28 toward the mating ring 18, bringing the primary ring seal face 32 toward contact with the mating ring seal face 24.

The primary ring 32 is illustrated in detail in FIGS. 2-5. The primary ring seal face 32 is defined by an outer diameter side 36 and an inner diameter side 38. The primary ring 28 further defines a chamfered surface 48 radially inward of the primary ring seal face 32 that forms no part of the seal face of primary ring 28.

The primary ring seal face 32 defines a generally annular recessed section 40 near the inner diameter side 38 of the primary ring seal face 32. It extends to a circumferential edge 37 intermediate the outer diameter side or edge 36 and the inner diameter side 38. A generally annular dam section 42 is near the outer diameter side or edge 36 of the primary ring seal face and extends to the intermediate circumferential edge 37. The recessed section 40 is axially displaced relative to the dam section 42 from a direction away from the seal interface. That is, it is positioned further away from the coacting surface of the other seal ring than the dam section 42.

The surface, defining the recessed section 40, is axially spaced from the opposing surface of the mating ring 18 when the primary ring 28 engages the mating ring 18. The dam section 42 of the primary ring seal face 32, in conjunction with a corresponding section of the mating ring seal face 24, creates a dam area preventing fluid leakage between the seal faces 24,32. The axial depth $d_1$ of the recessed section 40 relative to the dam section 42 is preferably in the range of 30 micro-inches to 500 micro-inches, depending on the viscosity of the fluid to be sealed and the operating speed, and more preferably in the range of 50 micro-inches to 150 micro-inches.

The primary ring seal face 32 also defines a pumping mechanism in the form of plurality of semi-circular grooves, generally known as hydro-pads 44. This pumping mechanism is formed on the surface defining the recessed section 40. The axial depth $d_2$ of the main face pattern, or the axial depth of the hydro-pads 44 as illustrated in this embodiment, relative to the dam section 42 is preferably 0.010 inches or higher, and more preferably 0.015 inches or higher. The axial depth $d_2$ of the main face pattern 44 should be greater than the axial depth $d_1$ of the recessed section 40.

The radial distance $r_1$ between the radially outer points of the grooves that form the hydro-pads 44 and the axial centerline 46 of the primary ring 28 is approximately the same the radial distance $r_2$ between the outer diameter of the recessed section 40 to circumferential edge 37 and the axial centerline 46 of the primary ring 28, within a radial distance of plus or minus 0.010 inches. In the embodiment of FIGS. 2-5, the radial extent of the recessed surface 40 comprises about 25 percent (%) of the radial extent of seal face 32 of seal ring 28 between inner diameter edge 38 and outer diameter edge 36. The radial extent of recess surface 40 could be increased to as much as 50 percent (%) depending on the sealing application involved. It is contemplated that the radial extent of the hydro-pad 44 would likewise increase and the radial outer terminus of the hydro-pad grooves would be co-extensive with the radial outer terminus of the recessed surface 40 within the tolerance previously discussed.

Figure 2:
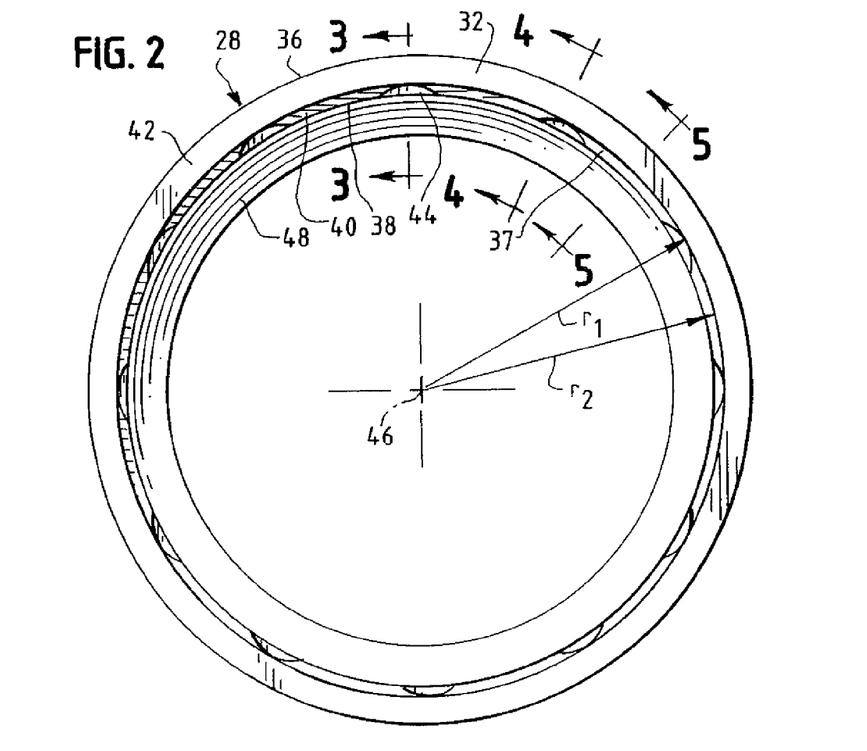
FIG. 2 is a plan view of the seal face of the primary ring of FIG. 1 taken along line 2-2 of FIG. 1 illustrating the present invention embodied in a seal ring having a hydro-pad pumping mechanism.
Figure 3:
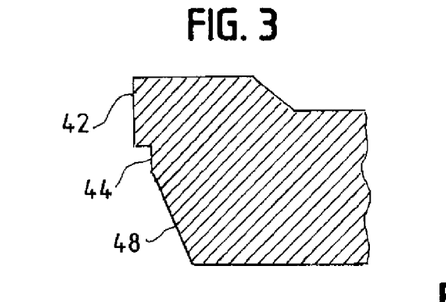
FIG. 3 is an enlarged sectional view of the primary ring of FIG. 2 taken along line 3-3 of FIG. 2.
Figure 4:
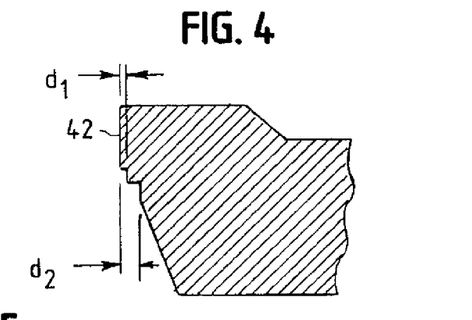
FIG. 4 is an enlarged sectional view of the primary ring of FIG. 2 taken along line 4-4 of FIG. 2.
Figure 5:
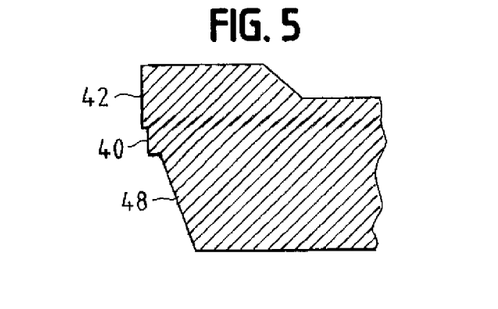
FIG. 5 is an enlarged sectional view of the primary ring of FIG. 2 taken along line 5-5 of FIG. 2.

The hydro-pads 44 serve to create a hydrodynamic force between the primary ring seal face 32 and the mating ring seal face 24 when the seal is in operation by drawing fluid between the primary ring seal face 32 and the mating ring seal face 24. The hydrodynamic force causes the seal faces 24,32 to separate slightly and reduces the friction between the primary ring 28 and the mating ring 18.

One of the inventive feature of the present invention is that the recessed hydro-pad seal face of the primary ring 32 is better able to limit the escape of fluid as compared to a conventional hydro-pad seal face. The recessed hydro-pad seal face 32 is able to better limit the escape of fluid for a number of reasons. First, conventional hydro-pads could generate too much hydrodynamic force to separate the faces of the primary ring and mating ring larger than desired. This larger than desired separation between the faces allows fluid to leak between the faces. The recessed hydro-pad seal face 32 deceases the amount of the hydrodynamic forces by forming the hydro-pads 44 in the recessed section 40, thus allowing some of the hydrodynamic force to dissipate into the recessed section 40.

Another reason the primary ring seal face 32 of the present invention is better able to limit the escape of fluid as compared to the conventional hydro-pad seal face is that a seal face with hydro-pads gets unevenly heated up due to the hydro-pads. This uneven heating of the seal face tends to develop thermal bumps locally. These thermal bumps prevent the primary ring seal face and mating ring seal face from getting closer to create an effective seal. By axially spacing the surface defining the hydro-pads 44 from the mating ring seal face 24 by forming the hydro-pads 44 in a recessed section 40, under static and pressurized condition, the minimum interfacial gap remains in the dam area. Furthermore, in the static position, the pressure can also cause bumps to develop on the primary ring seal face 32 due to uneven distortion in the circumferential direction. Any bumps that might develop on the primary ring seal face 32 will be at a distance from the mating ring seal face 24 so as not to interfere with the sealing function at the dam area. Hence, the seal face contact will be continuous in the circumferential direction, without interruption of the bumps formed by the hydro-pads. This will lead to good static sealing.

Also in a seal where the pumping mechanism is located adjacent the inner diameter of the seal face, the presence of the recessed portion better accommodates convex rotation or distortion of the seal ring. With the pumping mechanism located adjacent the outer diameter of the seal face, the presence of the recessed portion better accommodates concave rotation or distortion.

While the illustrative embodiment of a seal in FIG. 1 discloses the seal utilized in a single seal arrangement, the seal in accordance to the present invention can be utilized in a single seal arrangement, a double seal arrangement consisting of two single seals mounted back-to-back, or a tandem seal arrangement consisting of two single seals mounted in the same direction. For the most part, the other elements of the seal arrangement whether a double seal or a tandem seal are used, are similar to those elements of a conventional double seal arrangement or tandem seal arrangement as described in commonly assigned U.S. Pat. No. 6,626,436 to Pecht et al., the subject matter of which is hereby incorporated by reference.

Furthermore, while the illustrative embodiments of FIGS. 1-5 disclose the recessed section and the pumping mechanism such as hydro-pads 44 of FIG. 2 located near the inner diameter side of the seal face, the recessed section and the pumping mechanism can also be located at the outer diameter side of the seal face should the pressure be higher at the outer diameter side of the seal face than the pressure at the inner diameter side of the seal face. For such a seal arrangement, a generally annular dam section is defined near the inner diameter side of the seal face and a generally annular recessed section is defined near the outer diameter side of the seal face. In such an arrangement, the semi-circular grooves, forming the hydro-pads, are situated in the recessed section with the open ends directed radially outward. Hydro-pads located at the outer diameter side of the seal face are described in commonly assigned U.S. Pat. No. 4,407,512, the subject matter of which is hereby incorporated by reference. It should be noted that the seal face disclosed in U.S. Pat. No. 4,407,512 is different from the seal face 32 of the present invention at least for the reason that the hydro-pads of U.S. Pat. No. 4,407,512 are not situated in a recessed section such as recessed section 40 of the embodiment of FIGS. 1-5.

In addition, while the illustrative embodiment of FIGS. 2-5 discloses the use of hydro-pads to generate the hydrodynamic force to separate the faces of the primary ring and the mating ring, other seal face patterns can also be used to generate the hydrodynamic force. One such seal face pattern to generate hydrodynamic force is a wavy-tilt pattern seal described in U.S. Pat. No. 5,947,481 to Young, the subject matter of which is hereby incorporated by reference. Another seal face pattern to generate hydrodynamic force is a spiral groove design described in commonly assigned U.S. Pat. No. 5,938,206 to Klosterman, the subject matter of which is hereby incorporated by reference.

As with the use of a seal face with hydro-pads, the seal face of the alternative hydrodynamic force generating seal face patterns locates the wavy-tilt pattern seal or the spiral groove in a generally annular recessed section to reduce the hydrodynamic force and keep the bumps at a distance from the mating ring seal face as not to interfere with the sealing function at the dam area. The wavy seal or the spiral groove, along the recessed section for the which the wavy seal or the spiral groove is situated therein, can be located near the inner diameter side or near the outer diameter side of the seal face. For seal faces with wavy seal or spiral groove patterns, the axial depth of the recessed section relative to the dam section is preferably in the range of 20 micro-inches to 60 micro-inches and more preferably in the range of 25 micro-inches to 40 micro-inches. For a seal face with wavy seal or spiral groove patterns, the axial depth of the main face pattern, or the axial depth of the wavy seal or spiral groove, relative to the dam section is preferably 0.0001 inches or higher, and more preferably in the range of 0.0001 to 0.0003 inches. The axial depth of the main face pattern should be greater than the axial depth of the recessed section.

Also, while the illustrative embodiment discloses the hydro-pads and the recessed section located on the primary ring seal face, the hydro-pads (along the previous discussed alternative hydrodynamic force generating seal face designs) and the recessed section can be located on the mating ring seal face to generate the hydrodynamic force.

Figures 6, 9:
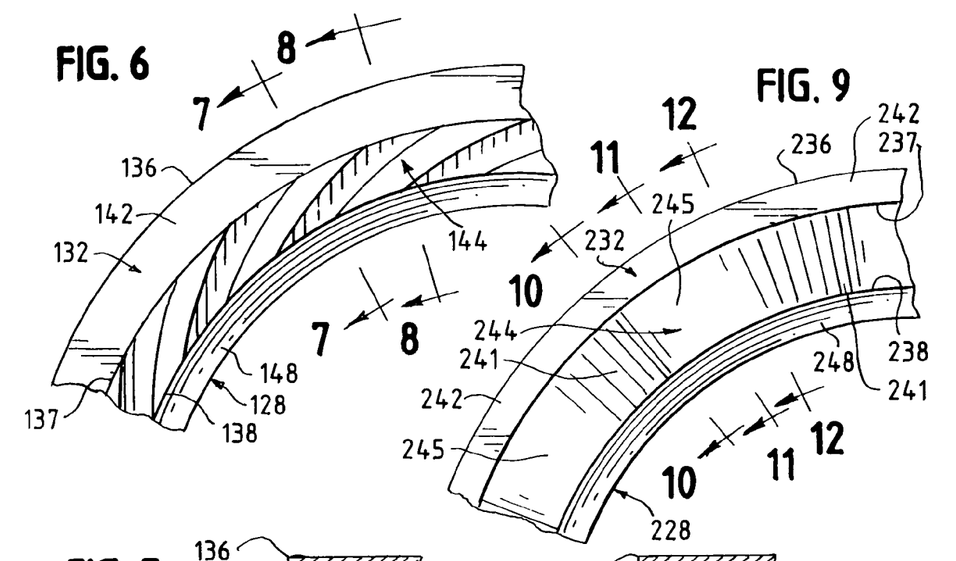
FIG. 6 is a fragmentary plan view of a face of a seal ring for an I.D. pressurized application embodying the present invention and having a spiral groove pumping mechanism.
FIG. 9 is a fragmentary plan view of a face of a seal ring for an I.D. pressurized application embodying the principles of the present invention and having a wavy face pumping mechanism.
Figure 7:
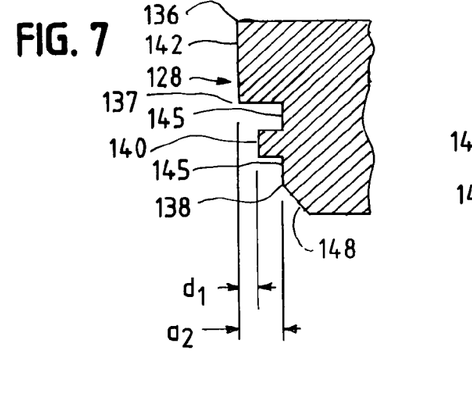
FIG. 7 is an enlarged sectional view of the seal ring of FIG. 6 taken along the line 7-7 of FIG. 6.
Figure 8:
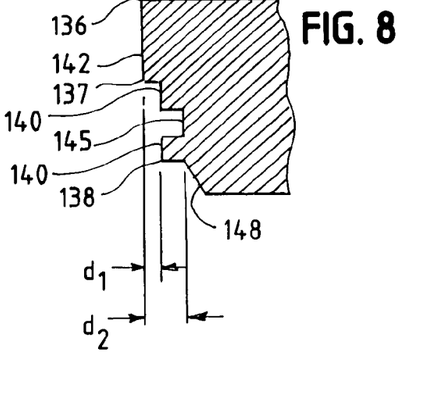
FIG. 8 is an enlarged sectional view of the seal ring of FIG. 6 taken along the line 8-8 of FIG. 6.

FIGS. 6-8 illustrate a mechanical seal primary ring 128 having a sealing face 132 incorporating the present invention. The seal ring 128 is suitable for application in the seal assembly in FIG. 1.

The primary ring seal face 132 is illustrated in detail in FIG. 6-8. It is defined by an outer diameter side or edge 136 and an inner diameter side or edge 138. The primary ring seal face 132 defines a generally annular recessed section 140 adjacent the inner diameter side 138 of the primary ring seal face 132 and a generally annular dam section 142 adjacent the outer diameter side 136 of the primary ring seal face. Circumferential edge 137 separates annular recessed section 140 from annular dam section 142. The primary ring 128 further defines a chamfered surface 148 radially inward of the primary ring seal face 132. It forms no part of the interactive seal face.

The surface, defining the recessed section 140, is axially displaced from the opposing surface of the mating ring 18 when the primary ring 128 engages the mating ring 18. The dam section 142 of the primary ring seal face 132, in conjunction with a corresponding section of the mating ring seal face 24, creates a dam area preventing fluid leakage between the seal faces 24, 132.

The primary ring seal face 132 also defines a pumping mechanism in the form of a spiral groove pattern 144 formed on the surface defining the recessed section 140. The spiral groove pumping mechanism is superimposed onto the surface of recessed section 140.

The spiral groove pattern 144 includes a plurality of lands which are coplanar with recessed surface 140. It also includes a plurality of grooves with bottom surfaces 145 that are below the surface 140. That is, the bottom surfaces 145 of the grooves 144 are axially spaced further away from mating ring face 24 than the recessed surface 140 when the seal rings 132 and 24 are assembled into a seal assembly such as that illustrated in FIG. 1.

The axial depths $d_1$ of the recessed portion or section 140 relative to dam 142 is between 20 and 60 micro-inches and preferably between 25 and 40 micro-inches.

The axial depth $d_2$ of the main face pattern to the bottom surfaces 145 of spiral grooves 144 as illustrated in this embodiment, relative to the dam section 142 is preferably 100 to 600 micro-inches or higher. The axial depth $d_2$ of the main face pattern 144 should be greater than the axial depth $d_1$ of the recessed section 140.

The radial inner circumferential edge 137 of the dam 142 is at about 50 percent (%) of the radial distance between the outer diameter side or edge 136 and inner diameter side or edge 138 of the seal face 132 of seal ring 128. The distance between the inner diameter side or edge 138 of the seal face 132 and the radial inner edge 137 of the dam defines the recessed portion 140 of the seal ring face 132.

The radial distance between the inner diameter 138 of seal ring 128 and circumferential edge 137 in the embodiment of FIGS. 6-8, and thus the radial extent of the recessed surface 140 and the groove pattern 144 comprises about 50 percent (%) of the radial extent of seal face 132 of seal ring 128 between inner diameter edge 138 and outer diameter edge 136. The radial extent of recess surface 140 and/or the pattern 144 could be increased beyond 50 percent (%) or decreased to less than 50 percent (%) depending on the sealing application involved.

The spiral groove pattern 144 serves to create a hydrodynamic force between the primary ring seal face 132 and the mating ring seal face 24 when the seal is in operation by drawing fluid between the primary ring seal face 132 and the mating ring seal face 24. The hydrodynamic force causes the seal faces 24, 132 to separate slightly and reduces the friction between the primary ring 128 and the mating ring 18.

FIGS. 9-12 illustrate a mechanical seal primary ring 228 having a sealing face 232 incorporating the present invention. The seal ring 228 is suitable for application in the seal assembly in FIG. 1.

The primary ring seal face 232 is illustrated in detail in FIG. 9-12. It is defined by an outer diameter side or edge 236 and an inner diameter side or edge 238. The primary ring seal face 232 defines a generally annular recessed section 240 adjacent the inner diameter side 238 of the primary ring seal face 232 and a generally annular dam section 242 adjacent the outer diameter side 236 of the primary ring seal face. Circumferential edge 237 separates annular recessed section 240 from annular dam section 242. The primary ring 228 further defines a chamfered surface 248 radially inward of the primary ring seal face 232. It forms no part of the interactive seal face.

The surface, defining the recessed section 240, is axially displaced from the opposing surface of the mating ring 18 when the primary ring 228 engages the mating ring 18. The dam section 242 of the primary ring seal face 232, in conjunction with a corresponding section of the mating ring seal face 24, creates a dam area preventing fluid leakage between the seal faces 24, 132.

The primary ring seal face 232 also defines a pumping mechanism in the form of a wavy-tilt pattern 244 formed on the surface defining the recessed section 240. Such patterns are disclosed in U.S. Pat. Nos. 4,836,561 and 5,947,481, the subject matter of which are hereby incorporated by reference. The wavy face pumping mechanism is superimposed onto the surface of recessed section 240.

The wavy face pattern 244 includes a plurality of spaced peaks 241 which are coextensive with recessed surface 240. The pattern 244 defines a smoothly curved surface that includes the peaks or waves 241 separated by radially-tilted regions. The radially-tilted regions commence at the level of the recessed surface 240 and progress axially deeper relative to the recessed surface 240 in a radial direction away from dam portion 242. The radially-tilted regions culminate in valley bottom portions 245 of a maximum axial depth relative to recessed surface 240 at inner edge or diameter 238 of seal ring face 232. The bottom surfaces 245 at edge 238 are spaced furthest away from mating ring face 24 when the seal rings 232 and 24 are assembled into a seal assembly such as that illustrated in FIG. 1.

Figure 10:
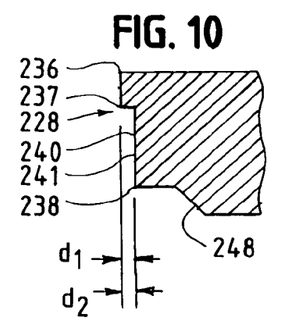
FIG. 10 is an enlarged sectional view of the seal ring of FIG. 9 taken along the line 10-10 of FIG. 9.
Figure 11:
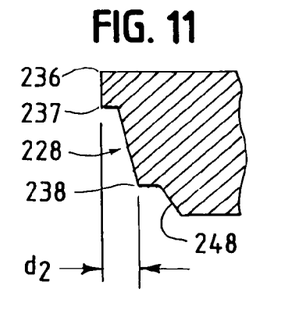
FIG. 11 is an enlarged sectional view of the seal ring of FIG. 9 taken along the line 11-11 of FIG. 9.
Figure 12:
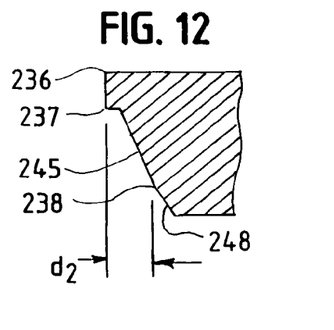
FIG. 12 is an enlarged sectional view of the seal ring of FIG. 9 taken along the line 12-12 of FIG. 9.
Figure 13:
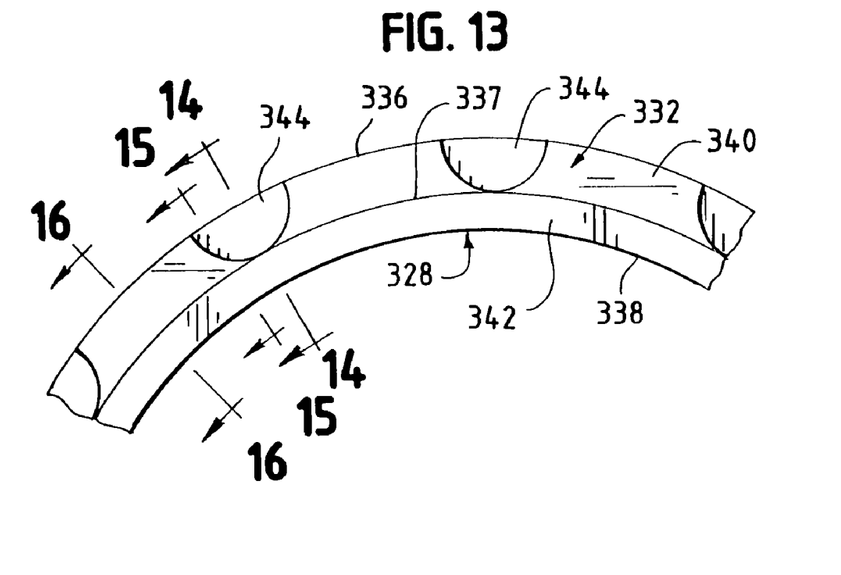
FIG. 13 is a fragmentary plan view of a face of a seal ring for an O.D. pressurized application embodying the present invention having a hydro-pad pumping mechanism.
Figure 14:
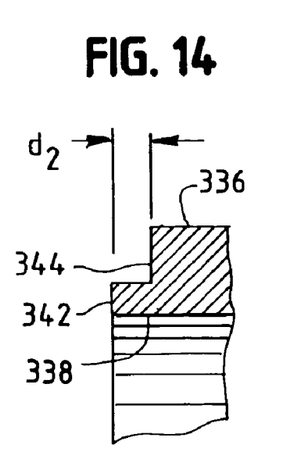
FIG. 14 is an enlarged sectional view of the seal ring of FIG. 13 taken along the line 14-14 of FIG. 13.
Figure 15:
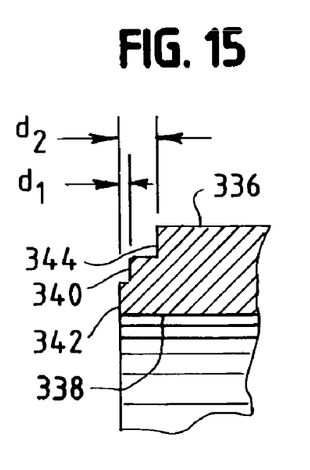
FIG. 15 is an enlarged sectional view of the seal ring of FIG. 14 taken along the line 15-15 of FIG. 14.
Figure 16:
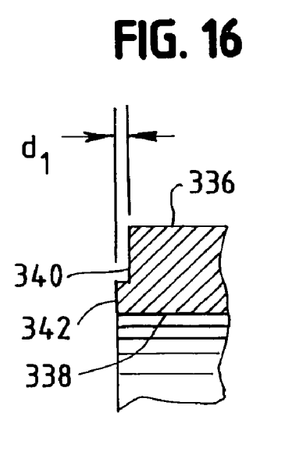
FIG. 16 is an enlarged sectional view of the seal ring of FIG. 15 taken along the line 16-16 of FIG. 15.

The axial depths $d_1$ of the recessed portion or section 240 relative to dam 242 is between 20 and 60 micro-inches and preferably between 25 and 40 micro-inches.

The axial depth $d_2$ of the main face pattern to the bottom surfaces 245 of the wavy-tilt pattern as illustrated in this embodiment, relative to the dam section 242 is preferably 100 to 600 micro-inches or higher. The axial depth $d_2$ of the main face pattern 244 should be greater than the axial depth $d_1$ of the recessed section 240.

The radial inner circumferential edge 237 of the dam 242 is at about 25 percent (%)of the radial distance between the outer diameter side or edge 236 and inner diameter side or edge 238 of the seal face 232 of seal ring 228. The distance between the inner diameter side or edge 238 of the seal face 232 and the radial inner edge 237 of the dam defines the recessed portion 240 of the seal ring face.

The radial distance between the inner diameter 238 of seal ring 228 and circumferential edge 237 in the embodiment of FIGS. 9-12, and thus the radial extent of the recessed surface 240 and the pattern 244 comprises about 75 percent (%) of the radial extent of seal face 232 of seal ring 228 between inner diameter edge 238 and outer diameter edge 236. The radial extent of recess surface 240 and/or the pattern 244 could be decreased to 50 percent (%) or less depending on the sealing application involved.

The wavy-tilt pattern 244 serves to create a hydrodynamic force between the primary ring seal face 232 and the mating ring seal face 24 when the seal is in operation by drawing fluid between the primary ring seal face 232 and the mating ring seal face 24. The hydrodynamic force causes the seal faces 24,232 to separate slightly and reduces the friction between the primary ring 228 and the mating ring 18.

FIGS. 13-16 illustrate the present invention applied to the seal face of an O.D. pressurized seal. That is, in this embodiment, the outside diameter or edge of the primary ring (and also the mating ring) is subjected to a fluid pressure higher than the pressure experienced at the inside diameter or edge of the seal interface. As illustrated, the primary seal ring 328 includes a face 332 with an inner circumferential edge or diameter 338 and an outer circumferential edge or diameter 336. A dam section 342 is adjacent the inner edge 338 of the ring 328. It extends radially outwardly to edge 337 about mid-way between circumferential edges 336 and 338. A recessed portion 340 extends between edge 337 and outer edge 336 of ring face 332.

Superimposed on the recessed portion 340 is a pumping mechanism in the form of hydro-pad grooves 344. Hydro-pad grooves 344 open radially outward of the outer circumferential edge 336 of the seal ring 328.

As in the embodiment of FIGS. 2-5, the recessed portion has an axial depth $d_1$, relative to dam surface 342. The hydro-pad grooves 344 have a depth $d_2$ which exceeds the depth $d_1$. The relationship between the axial depth of the recessed surface 340 and the depth of the hydro-pad grooves 344 relative to dam surface 340 are as described with respect to the embodiment of FIGS. 2-5.

Figure 17:
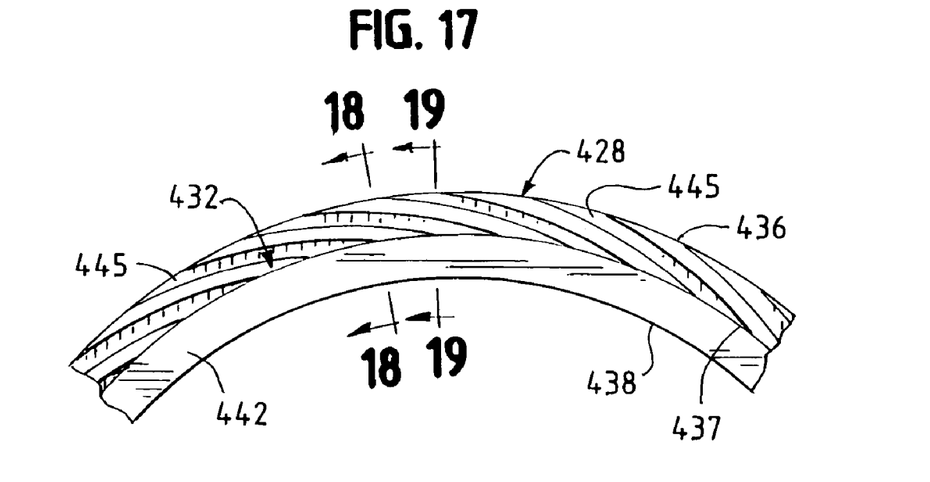
FIG. 17 is a fragmentary plan view of a face of a seal ring for an O.D. pressurized application embodying the present invention and having a spiral groove pumping mechanism.
Figure 18:
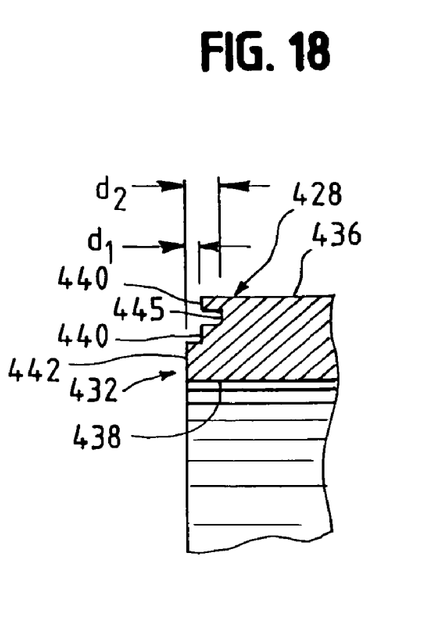
FIG. 18 is an enlarged sectional view of the seal ring of FIG. 17 taken along the line 18-18 of FIG. 17.
Figure 19:
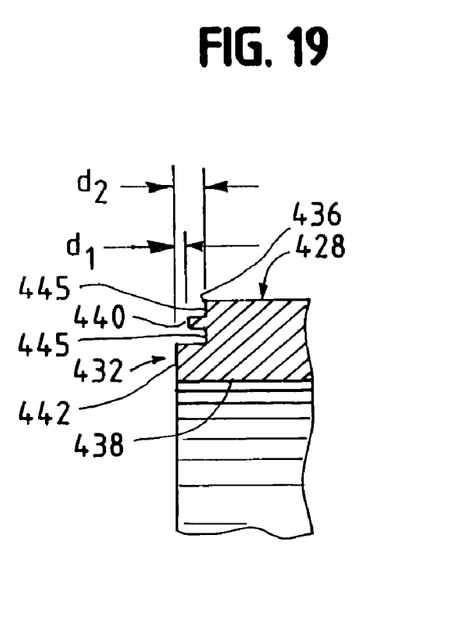
FIG. 19 is an enlarged sectional view of the seal ring of FIG. 17 taken along the line 19-19 of FIG. 17.
Figure 20:
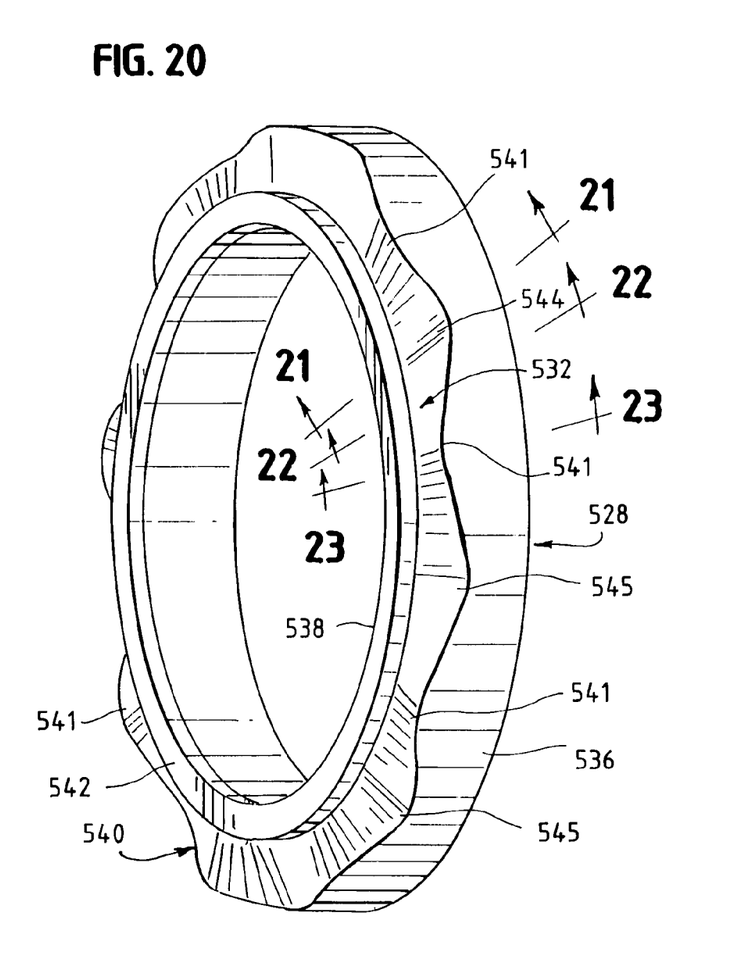
FIG. 20 is a fragmentary plan view of a face of a seal ring for an I.D. pressurized application embodying the present invention and having a wavy face pumping mechanism.
Figure 21:
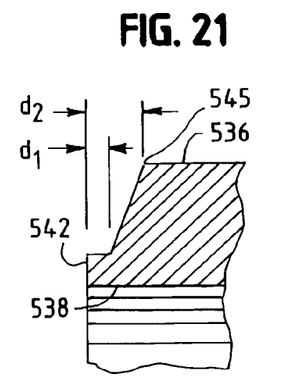
FIG. 21 is an enlarged sectional view of the seal ring of FIG. 20 taken along the line 21-21 of FIG. 20.
Figure 22:
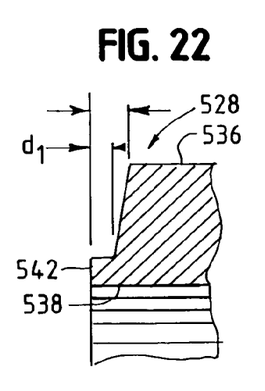
FIG. 22 is an enlarged sectional view of the seal ring of FIG. 20 taken along the line 22-22 of FIG. 20.
Figure 23:
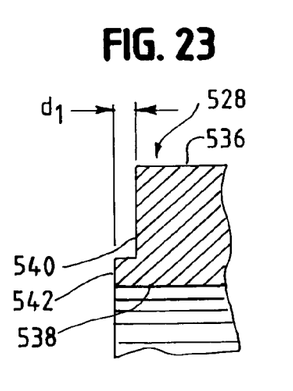
FIG. 23 is an enlarged sectional view of the seal ring of FIG. 20 taken along the line 23-23 of FIG. 20.

FIGS. 17-19 illustrate the present invention applied to the seal face of an O.D. pressurized seal. That is, in this embodiment, the outside diameter or edge of the primary ring (and also the mating ring) is subjected to a fluid pressure higher than the pressure experienced at the inside diameter or edge of the seal interface. As illustrated, the primary seal ring 428 includes a face 432 with an inner circumferential edge or diameter 438 and outer circumferential edge or diameter 436. A dam section 442 is adjacent the inner edge 438 of the ring 428. It extends radially outward to edge 437 about mid-way between circumferential edges 436 and 438. A recessed portion 440 extends between edge 437 and outer edge 436 of ring face 432.

Superimposed on the recessed portion 440 is a pumping mechanism in the form of spiral groove pattern 444 with grooves open radially outward of the outer circumferential edge 436 of the seal ring 428. The pattern includes lands coextensive with recessed portion 440 and grooves with bottom surfaces 445.

As in the embodiment of FIGS. 2-5, the recessed portion 440 has an axial depth $d_1$, relative to dam surface 442. The bottoms 445 of groove of pattern 444 have a depth $d_2$ which exceeds the depth dl. The relationship between the axial depth of the recessed surface 440 and the depth of the bottom surfaces 445 of the grooves relative to dam surface 442 is as described with respect to the embodiment of FIGS. 6-8.

FIGS. 20-23 illustrate the present invention applied to the seal face of an O.D. pressurized seal. That is, in this embodiment, the outside diameter or edge of the primary ring (and also the mating ring) is subjected to a fluid pressure higher than the pressure experienced at the inside diameter or edge of the seal interface. As illustrated, the primary seal ring 528 includes a face 532 with an inner circumferential edge or diameter 538 and an outer circumferential outer edge or diameter 536 A dam section 542 is adjacent the inner edge 538 of the ring 528. It extends radially outward to edge 537 between circumferential edges 536 and 538. A recessed portion 540 extends between edge 537 and outer edge 536 of ring face 532.

Superimposed on the recessed portion 540 is a pumping mechanism in the form of a wavy-tilt pattern 544. The wavy-tilt pattern 544 includes a plurality of spaced peaks 541 which are coextensive with recessed surface 540. The pattern 544 defines a smoothly curved surface that includes the peaks or waves 541 separated by radially-tilted regions. The radially-tilted regions commence at the level of the recessed surface 540 and progress axially deeper relative to the recessed surface 540 in a radial direction away from dam portion 542. The radially-tilted regions culminate in valley bottom portions 545 having a maximum axial depth relative to recessed surface 540 at outer edge or diameter 536 of seal ring face 532. The bottom surfaces 545 at edge 536 are spaced furthest away from mating ring face 24 when the seal rings 532 and 24 are assembled into a seal assembly such as that illustrated in FIG. 1.

As in the embodiment of FIGS. 2-5, the recessed portion 540 has an axial depth $d_1$, relative to dam surface 542. The bottom surfaces 545 of the radially-tilted regions have a depth $d_2$ which exceeds the depth $d_1$. The relationship between the axial depth of the recessed surface 540 and the maximum depth at the bottom 545 as described with respect to the embodiment of FIGS. 9-12.

Various features of the present invention have been explained with reference to the embodiments shown and described. It must be understood, however, that modifications may made without departing from the spirit of the invention and scope of the following claims.

The invention claimed is:

1. A seal ring adapted to be disposed about a shaft to seal a fluid, said seal ring comprising:
   an annular body defining an annular seal face;
   said seal face adapted to be disposed in opposing relationship to another seal ring face to define a seal interface;
   wherein said seal ring seal face includes an inner diameter side and an outer diameter side and includes a surface defining a dam section that extends from one of said inner diameter sides and outer diameter sides to an intermediate circumferential edge and a surface that defines a recessed section that extends from the other of said one of said inner diameter sides and said outer diameter sides to said intermediate circumferential edge, wherein said surface defining said recessed section is axially displaced throughout its extent relative to said surface defining said dam section; and,
   a pumping mechanism defined by a main face pattern formed on said surface defining said recessed section, said main face pattern extending from said one of said inner diameter sides and outer diameter sides to said intermediate circumferential edge, said main face pattern having an axial depth relative to said surface defining said dam section greater than the axial depth of said surface defining said recessed section, such that the axial depth of said main face pattern is greater than the axial depth of said surface defining said recessed section throughout the extent of said main face pattern and said recessed section.

2. The seal ring configuration as claimed in claim 1 wherein said main face pattern includes a plurality of semi-circular grooves.

3. The seal ring configuration as claimed in claim 1 wherein said seal ring defining said recessed section is adapted to be axially moveable in a seal assembly.

4. The seal ring configuration as claimed in claim 1 wherein said recessed section is located adjacent the inner diameter side and the dam section is located adjacent the outer diameter side.

5. The seal ring configuration as claimed in claim 1 wherein the depth of the recessed section relative to the dam section is in the range of 30 micro-inches to 500 micro-inches.

6. The seal ring configuration as claimed in claim 1 wherein the depth of the recessed section relative to the dam section is in the range of 50 micro-inches to 150 micro-inches.

7. The seal ring configuration as claimed in claim 2 wherein the axial depth of at least portions of said main face pattern relative to the dam section is at least 0.010 inches.

8. The seal ring configuration as claimed in claim 7 wherein the axial depth of said main face pattern relative to the dam section is at least 0.015 inches.

9. The seal ring configuration as claimed in claim 2 wherein the distance between radially outer points of said grooves and the axial centerline of said seal ring is approximately the same as the distance between the outer diameter of the recessed section and the centerline of said seal ring.

10. The seal ring configuration as claimed in claim 1 is a single seal arrangement.

11. A seal ring configuration as claimed in claim 2 wherein said semi-circular grooves open radially inward to said inner diameter side.

12. A seal ring configuration as claimed in clalm 2 wherein said semi-circular grooves open radially outward to said outer diameter side.

13. A seal ring adapted to be disposed about a shaft to seal a fluid, said seal ring comprising:
   an annular body defining an annular seal face;
   said seal face adapted to be disposed in opposing relationship to another seal ring face to define a seal interface;
   wherein said seal ring seal face includes an inner diameter edge and an outer diameter edge and includes a surface defining a dam section that extends from one of said inner diameter edge and outer diameter edge to an intermediate circumferential edge and a surface that defines a recessed section that extends from the other of said one of said inner diameter edge and said outer diameter edge to said intermediate circumferential edge, wherein said surface defining said recessed section is axially displaced throughout its extent relative to said surface defining said dam section; and,
   a pumping mechanism on said surface defining said recessed section, said pumping mechanism comprising a plurality of grooves extending from said one of said inner diameter edge and outer diameter edge to said intermediate circumferential edge, said grooves having an axial depth relative to said surface defining said dam section greater than the axial depth of said surface defining said recessed section, such that the axial depth of said pumping mechanism is greater than the axial depth of said surface defining said recessed section throughout the extent of said pumping mechanism and said recessed section.

* * * * *